United States Patent
Kamioka et al.

(10) Patent No.: US 9,415,506 B2
(45) Date of Patent: Aug. 16, 2016

(54) ROBOT

(71) Applicant: HONDA MOTOR CO., LTD., Tokyo (JP)

(72) Inventors: Takumi Kamioka, Saitama (JP); Hiroyuki Kaneko, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 14/590,058

(22) Filed: Jan. 6, 2015

(65) Prior Publication Data

US 2015/0217447 A1 Aug. 6, 2015

(30) Foreign Application Priority Data

Feb. 4, 2014 (JP) .................................. 2014-019122

(51) Int. Cl.
| | |
|---|---|
| *G05B 15/00* | (2006.01) |
| *G05B 19/00* | (2006.01) |
| *B25J 9/10* | (2006.01) |
| *B62D 57/032* | (2006.01) |
| *G06F 17/18* | (2006.01) |

(52) U.S. Cl.
CPC ................ *B25J 9/10* (2013.01); *B62D 57/032* (2013.01); *G06F 17/18* (2013.01)

(58) Field of Classification Search
USPC ......... 700/245, 260, 246, 253, 257, 247, 249; 318/568.12, 568.11; 901/1
See application file for complete search history.

(56) References Cited

U.S. PATENT DOCUMENTS

| | | | | |
|---|---|---|---|---|
| 7,072,740 | B2 * | 7/2006 | Iribe ...................... | G06N 3/008 180/8.1 |
| 7,308,335 | B2 * | 12/2007 | Takenaka ............. | B62D 57/032 318/568.1 |
| 7,313,463 | B2 * | 12/2007 | Herr ..................... | B62D 57/032 318/568.1 |
| 7,603,199 | B2 * | 10/2009 | Takenaka ............. | B62D 57/032 180/65.1 |
| 8,204,626 | B2 * | 6/2012 | Yoshiike .............. | B62D 57/032 250/332 |
| 8,306,657 | B2 * | 11/2012 | Yoshiike .............. | B62D 57/032 700/245 |
| 8,311,677 | B2 * | 11/2012 | Yoshiike .............. | B62D 57/032 700/245 |

FOREIGN PATENT DOCUMENTS

| | | |
|---|---|---|
| JP | 2011-031349 | 2/2011 |
| JP | 2011-031350 | 2/2011 |

* cited by examiner

*Primary Examiner* — Ronnie Mancho
(74) *Attorney, Agent, or Firm* — Rankin, Hill & Clark LLP (57) ABSTRACT

Provided is a robot capable of achieving more efficient and faster calculation for generating a gait. A target ZMP trajectory of a robot 1 is defined by a linear function of a target landing position that uses a time function as a coefficient. The time function is defined by a function that permits specified function transformation related to time, and a dynamics model is defined by the specified function transformation related to time. Thus, the problem of determining a target landing position is formulated as a problem accompanied by a linear constraint in which a first specified requirement (a target ZMP trajectory linearly approximated by the linear function of a target landing position falls within a permissible existence range) is satisfied.

5 Claims, 8 Drawing Sheets

$$\alpha(t) = \frac{t}{T}$$

FIG5 B $$\alpha(t) = a_0 + a_1 t + \cdots + a_n t^n$$

FIG5 C $$\alpha(t) = \cos \omega t$$

ROBOT

BACKGROUND OF THE INVENTION

1. Field of the Invention

The present invention relates to the generation of gaits for a legged mobile robot.

2. Description of the Related Art

There has been proposed a technical method whereby to cause a legged mobile robot to act in a pattern that is appropriate in light of a behavior objective of the robot in response to a disturbance of an arbitrary form (refer to Japanese Patent Application Laid-Open No. 2011-031349 and Japanese Patent Application Laid-Open No. 2011-031350).

Specifically, each of a plurality of modules, which are hierarchized according to the frequency band levels, searches for behavior candidates that are the candidates for the behavior patterns of the robot compatible with a main objective and a sub objective while prioritizing the main objective for which a self-module is responsible over the sub objectives for which other modules are responsible. The behavior of the robot is controlled such that a robot behavior candidate searched for by a high-frequency (j)th module is preferentially reflected over a behavior candidate of a robot R searched for by a low-frequency (j+1)th module.

However, according to the method, calculation time of an order of 100 ms is required for searching for a behavior candidate of a robot, so that the generation of a target gait and the control for following the target gait on a real-time basis may become difficult.

SUMMARY OF THE INVENTION

Therefore, an object of the present invention is to provide a robot capable of achieving more efficient and faster calculation for generating a gait.

The present invention relates to a robot provided with a body, a plurality of legs extended from the body, and a control unit configured to control motions of the plurality of legs so as to follow a target gait that includes a target ZMP trajectory and target landing positions of the plurality of legs.

In the robot according to the present invention, the control unit includes: a first arithmetic processing element configured to determine an amount of an influence exerted by a target ZMP trajectory on a divergent component of a behavior of the body based on the target ZMP trajectory defined by a linear function of target landing positions of the plurality of legs, which uses, as a coefficient, a time function that permits specified function transformation related to time, according to a dynamics model which represents a relationship between motions of the body and the plurality of legs and a ground reaction force acting on the robot and which is defined by the specified function transformation related to time; and a second arithmetic processing element configured to determine, based on the amount of the influence determined by the first arithmetic processing element, a ZMP modification amount and the target landing positions based thereon such that a first specified requirement is satisfied that the target ZMP trajectory obtained as a result of adding the ZMP modification amount, which is defined as a linear function of the target landing positions, to the target ZMP trajectory falls within a permissible existence area, a placement configuration of which is determined according to a placement configuration of a contact surface between the plurality of legs and a floor.

According to the robot in accordance with the present invention, a target ZMP trajectory is defined by the linear function of a target landing position that uses a time function as a coefficient, so that the amount of the influence exerted by the target ZMP trajectory on a divergent component of the behavior of the body is defined as the linear function of a target landing position that uses, as a coefficient, an arithmetic processing result of a time function according to a dynamics model. The time function is defined by a function that permits specified function transformation related to time and the dynamics model is defined by the specified function transformation related to time, thus permitting analytical calculation of the arithmetic processing result of the time function according to the dynamics model.

Thus, a ZMP modification amount is determined on the basis of the amount of the influence on the divergent component, and consequently a target ZMP trajectory, which is a result of combining the target ZMP trajectory and the ZMP modification amount, is linearly approximated by the linear function of a target landing position, which uses a constant based on the result of the analytical calculation as a coefficient and an intercept. Thus, the problem of determining a target landing position is formulated as a problem accompanied by a linear constraint in which a first specified requirement (a target ZMP trajectory linearly approximated by the linear function of a target landing position falls within a permissible existence range) is satisfied. This achieves faster and more efficient generation of a target gait including a target landing position of each leg.

The second arithmetic processing element is preferably configured to determine the target landing position such that a second specified requirement that an assessment function based on a specified assessment standard of the target landing position indicates a maximum value or a minimum value is also satisfied.

According to the robot having the aforesaid configuration, the problem of determining the target landing position is formulated as a linearly constrained problem of optimization in light of a specified assessment standard, thus achieving faster and more efficient generation of a target gait including the target landing position of each leg.

The second arithmetic processing element is preferably configured to determine the target landing position by using, as the assessment function, an increasing function or a decreasing function, which uses an interval between the target landing position and a desired landing position or a boundary of a permissible landing range as a variable. The second arithmetic processing element is preferably configured to determine the target landing position by using a quadratic function as the assessment function.

According to the robot configured as described above, the problem of determining a target landing position is formulated as an optimization problem with a linear constraint in which a target landing position coincides with a desired landing position or landing that would cause a robot to deviate from a permissible landing range is avoided. This achieves faster and more efficient generation of a target gait including a target landing position of each leg.

BRIEF DESCRIPTION OF THE DRAWINGS

FIG. 8A to FIG. 8G are explanatory diagrams illustrating the results of gait generation (experimental results).

DESCRIPTION OF THE PREFERRED EMBODIMENTS (Configuration of the Robot)

Figure 1:
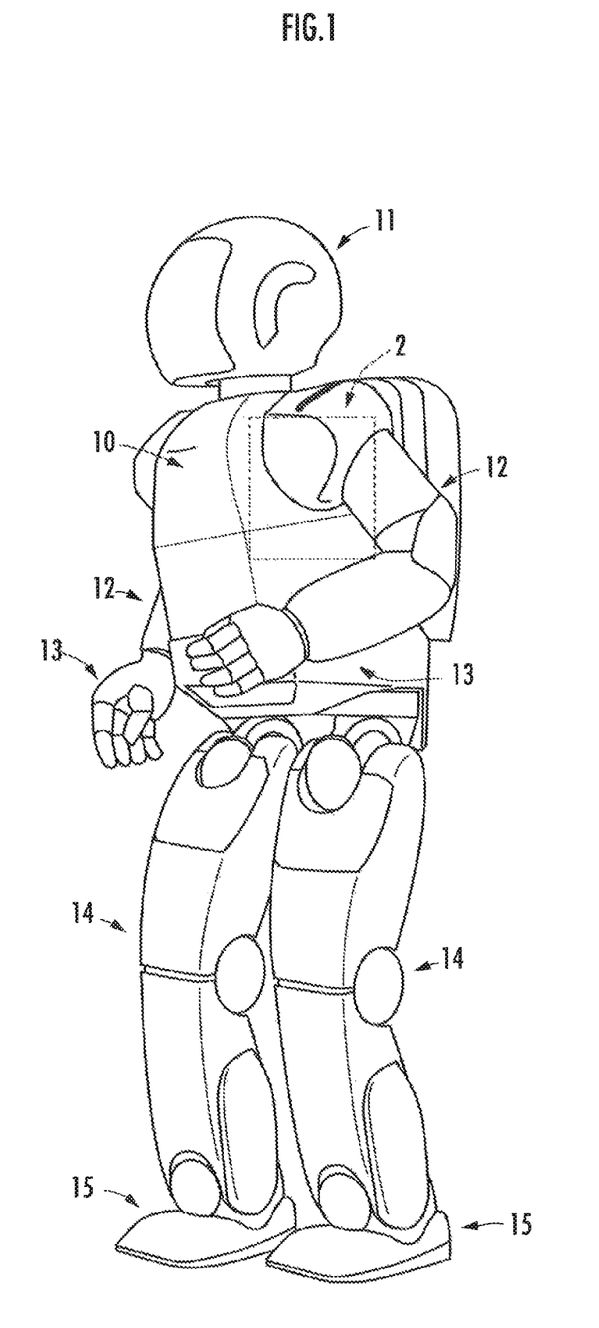
FIG. 1 is an explanatory diagram illustrating the configuration of a robot, which is an embodiment of the present invention.

A robot 1, which is an embodiment of the mobile device in accordance with the present invention illustrated in FIG. 1, is a legged mobile robot. To distinguish between left and right, characters "L" and "R" will be used, as necessary. Like a human being, the robot 1 has a body 10, a head 11 provided on the top portion of the body 10, left and right arms 12 extended from both upper left and right sides of the body 10, hands 13 provided at the distal end portions of the arms 12, left and right legs 14 extended downward from the bottom portion of the body 10, and feet 15 attached to the distal end portions of the legs 14. The robot 1 is capable of bending and stretching the arms 12 and the legs 14, respectively, at a plurality of joint mechanisms corresponding to a plurality of joints, such as shoulder joints, elbow joints, wrist joints, hip joints, knee joints and ankle joints, of a human being by forces transmitted from actuators MOTs (refer to FIG. 2).

Each of the arms 12 is provided with a first arm link, which is connected to the body 10 through a shoulder joint mechanism, and a second arm link, one end of which is connected to an end portion of the first arm link through the elbow joint mechanism and the other end of which is connected to the proximal end portion of the hand 13 through the wrist joint. The shoulder joint mechanism has two degrees of freedom of rotation about a yaw axis and a pitch axis. The elbow joint mechanism has one degree of freedom of rotation about the pitch axis. The wrist joint mechanism has two degrees of freedom of rotation about a roll axis and the pitch axis.

Each of the legs 14 is provided with a first leg link connected to the body 10 through the hip joint mechanism, and a second leg link, one end of which is connected to an end portion of the first leg link through the knee joint mechanism and the other end of which is connected to the foot 15 through the ankle joint. The hip joint mechanism has three degrees of freedom of rotation about the yaw axis, the pitch axis and the roll axis. The knee joint mechanism has one degree of freedom of rotation about the pitch axis. The ankle joint mechanism has two degrees of freedom of rotation about the pitch axis and the roll axis. The robot 1 is capable of autonomously traveling by the motion of each of the left and right legs 14 repeatedly leaving a ground and landing on the ground.

(Configuration of the Control Unit)

Figure 2:
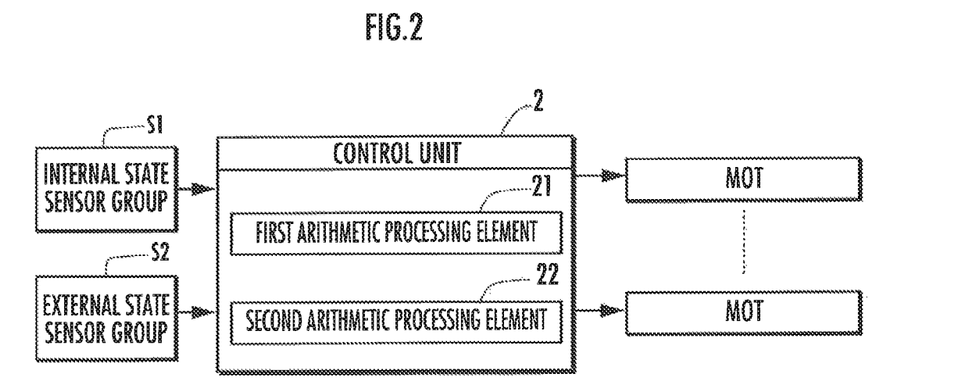
FIG. 2 is an explanatory diagram illustrating the configuration of a control unit.

A control unit 2 illustrated in FIG. 2 is constituted of a programmable computer or electronic control unit (composed of a CPU, a ROM, a RAM, an I/O circuit and the like) installed in the robot 1. The control unit 2 is configured to recognize the values of various state variables on the basis of the output signals of an internal state sensor group S1 and an external state sensor group S2, respectively, and to control the operations of the actuators MOTs on the basis of the results of the recognition.

The internal state sensor group S1 mainly includes a gyro sensor, which measures the posture of the body 10, and rotary encoders, which measure the bending angles or the like of each joint mechanisms, in addition to a GPS measuring device, which measures the position (the position of the gravity center) of the robot 1, or an acceleration sensor.

The external state sensor group S2 mainly includes a stereo image sensor installed to the head 11 to measure the positional trajectory of an object, such as a ball, related to a task to be carried out, and an active sensor, which is installed to the body 10 and which uses infrared light, in addition to an independent motion capture system (not illustrated), which is separate from the robot 1.

The control unit 2 includes a first arithmetic processing element 21 and a second arithmetic processing element 22. The first arithmetic processing element 21 is configured to determine the amount of influence exerted by a target ZMP trajectory on a divergent component of the behavior of the body 10 according to a dynamics model on the basis of a target ZMP trajectory. The second arithmetic processing element 22 is configured to determine a ZMP modification amount and a target landing position based on the ZMP modification amount on the basis of the amount of influence determined by the first arithmetic processing element 21 such that a specified requirement is satisfied.

A single processor (arithmetic processing unit) may function as the two arithmetic processing elements 21 and 22 or a plurality of processors may work together by intercommunication to function as the two arithmetic processing elements 21 and 22.

Each of the arithmetic processing elements being configured to carry out arithmetic processing for which each of the arithmetic processing elements is responsible means that an arithmetic processing unit, such as a CPU, constituting each of the arithmetic processing elements is programmed or designed to read out necessary information and software from a memory, such as a ROM or RAM, or a recording medium and carry out arithmetic processing on the information according to the software.

(Method of Generating a Gait of the Robot)

Figure 3:
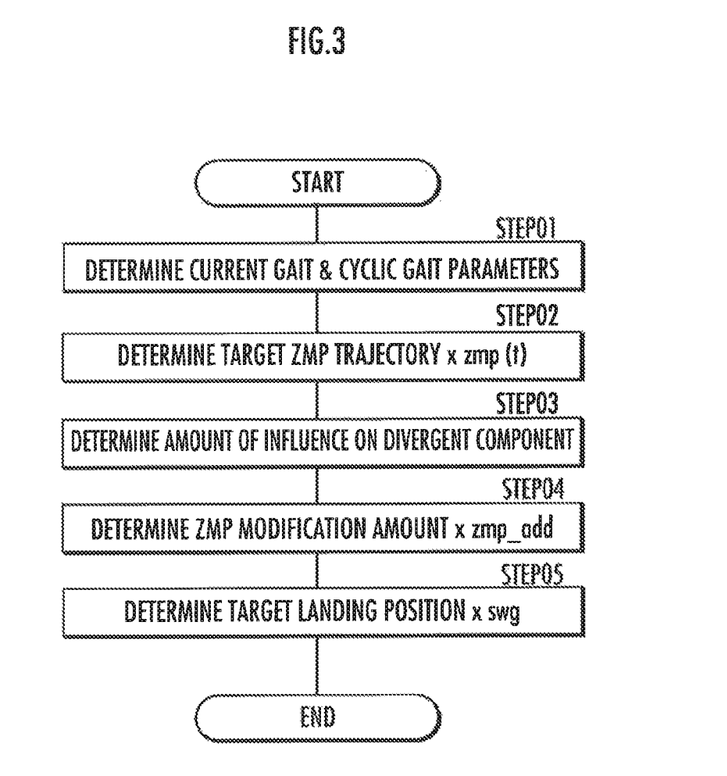
FIG. 3 is an explanatory diagram illustrating a gait generation method.

In response to a travel instruction, the target landing positions of a current gait and a cyclic gait following the current gait and a walking cycle are determined (STEP01 of FIG. 3). The number of steps of each of the current gait and the cyclic gait is arbitrary. In this case, a gait of two steps from the present moment t=0 is generated as the current gait, and a gait of another two steps is generated as the cyclic gait. A first step of the current gait will be referred to as the first current gait (cur1) and a second step thereof will be referred to as the second current gait (cur2). A first step of the cyclic gait will be referred to as the first cyclic gait (cyc1) and a second step thereof will be referred to as the second cyclic gait (cyc2).

Thus, the end time of the first current gait $t=t_{cur1}$ ($=T_{cur1}$), the end time of the second current gait $t=t_{cur2}$ ($=T_{cur1}+T_{cur2}$), the end time of the first cyclic gait $t_{cyc1}$ ($=T_{cur1}+T_{cur2}+T_{cyc1}$), the end time of the second cyclic gait $t_{cyc2}$ ($=T_{cur1}+T_{cur2}+T_{cyc1}+T_{cyc2}$), and a landing position $x_{swg}(t)$ at each time are set.

Figure 4:
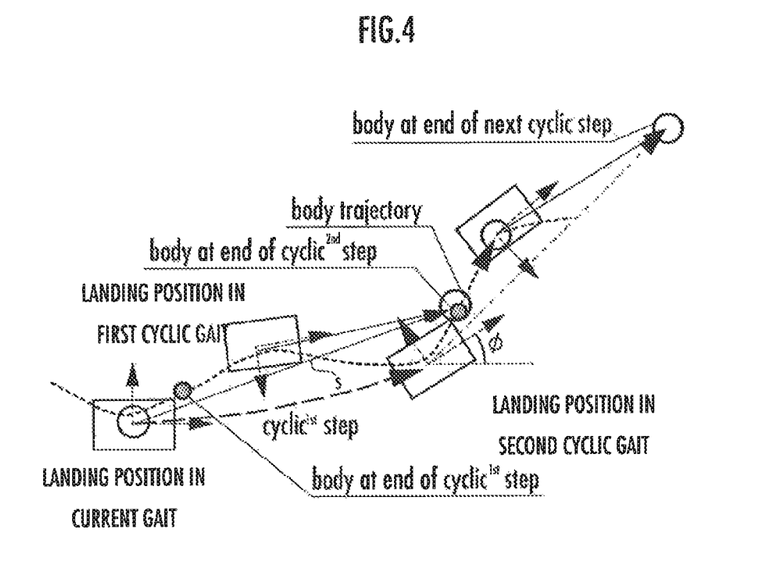
FIG. 4 is an explanatory diagram illustrating a cyclic gait.

As illustrated in FIG. 4, the cyclic gait is a gait whereby a successive, cyclic motion is generated, except for the amount of travel in a world coordinate system (absolute space), by repeatedly generating the first and the second cyclic gaits alternately. In other words, the start state and the end state of a cyclic gait are required to coincide with each other except for a position and a posture in the world coordinate system. This means that the continuity condition of a cyclic gait must be satisfied.

The target ZMP trajectory parameters of the cyclic gait and the current gait are set (STEP02 of FIG. 3). A target ZMP trajectory $x_{zmp}$ (t) is represented by means of parameters, namely, the boundary time of each phase and a target ZMP position at the boundary time for each step. More specifically, a linear function of the target landing position $x_{swg}$, the slope of which is denoted by time function α (t), is set as the target ZMP trajectory $x_{zmp}$ (t), as indicated by relational expression (02).

$$X_{zmp}(t) = \alpha(t) x_{swg} \quad (02)$$

Figure 5:
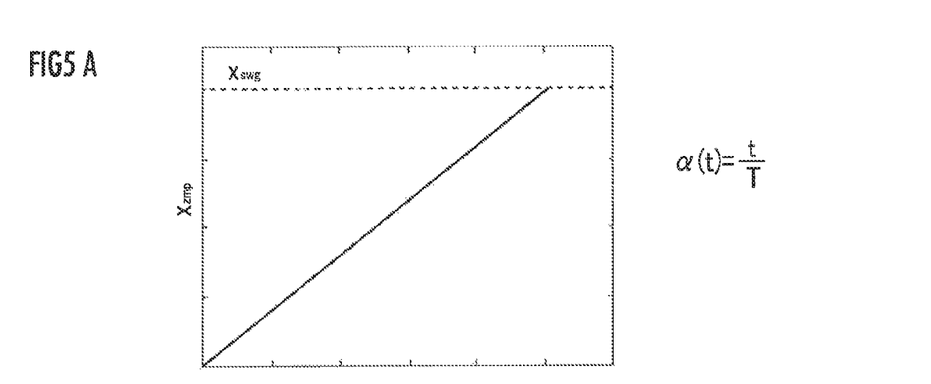
FIG. 5A is an explanatory diagram illustrating a first example related to the linear approximation of a ZMP trajectory.
FIG. 5B is an explanatory diagram illustrating a second example related to the linear approximation of the ZMP trajectory.
FIG. 5C is an explanatory diagram illustrating a third example related to the linear approximation of the ZMP trajectory.

The linear approximation is the approximation for assessing the stability of the landing position $x_{swg}$ and does not have to coincide with an actual ZMP trajectory of the robot 1. The time function α(t) is defined by a function that can be subjected to Laplace transformation. FIG. 5A, FIG. 5B and FIG. 5C illustrate target ZMP trajectories $x_{zmp}$ (t) obtained in the case where the time function α(t) is defined by (1) t/T (linear function), (2) $a_0 + a_1 t + \ldots + a_n t^n$ (polynomial function), and (3) cos (ωt) (trigonometric function), respectively.

Figure 6:
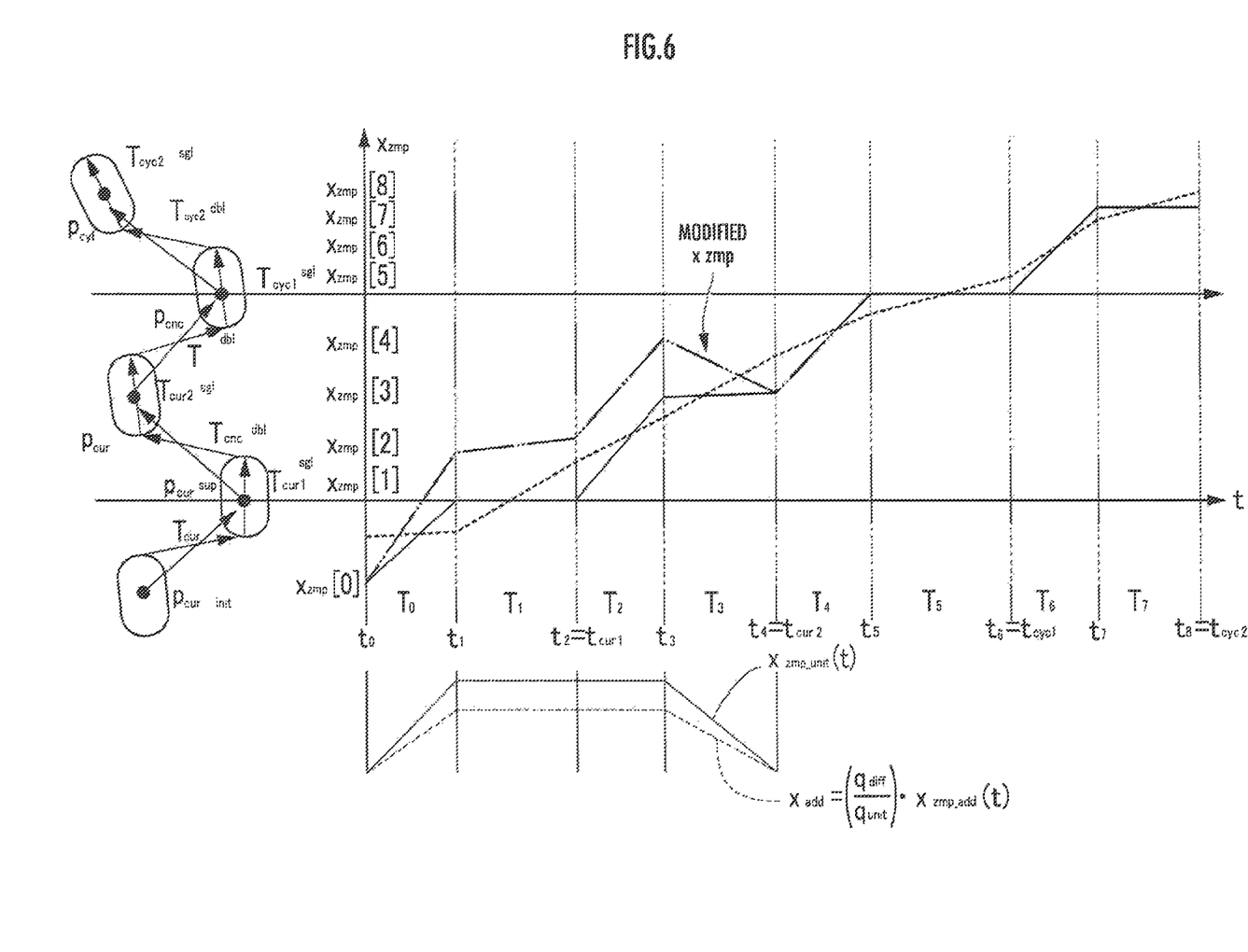
FIG. 6 is an explanatory diagram illustrating the modification of the ZMP trajectory.

For example, as illustrated by the solid line in FIG. 6, the target ZMP position $x_{zmp}$ (t) at each time, including $t = t_{cur1}$, $t_{cur2}$, $t_{cyc1}$ and $t_{cyc2}$, is set. More specifically, the target ZMP position $x_{zmp}$ is determined such that the target ZMP position $x_{zmp}$ is fixed at the landing position of the foot of a support leg in single stance phases (sections) $T_1$, $T_3$, $T_5$ and $T_7$, and displaced from a current landing position to a next landing position in double stance phases (sections) $T_0$, $T_2$, $T_4$ and $T_6$. The landing position of each foot means the position of the center of contact surface between the foot and a floor.

Specifically, the target ZMP is defined such that the target ZMP is displaced in the order of: $x_{zmp}$ [0]=$x_{swg}$ [0]→$x_{zmp}$ [1]=$x_{swg}$ [$t_{cur1}$]→$x_{zmp}$ [2]=$x_{zmp}$ [1]→$x_{zmp}$ [3]=$x_{swg}$ [$t_{cur2}$]→$x_{zmp}$ [4]=$x_{zmp}$ [3]→$x_{zmp}$ [5]=$x_{swg}$ [$t_{cyc1}$]→$x_{zmp}$ [6]=$x_{smp}$[5]→$x_{zmp}$ [7]=$x_{swg}$ [$t_{cyc2}$]→$x_{zmp}$ [8]=$x_{zmp}$ [7].

As indicated by the dashed line in FIG. 6, an actual target ZMP position $x_{zmp}$ may be designed to be displaced from a heel (the rear end portion of the foot of a support leg) to a toe (the distal end portion of the foot of the support leg) in a single stance phase and to be displaced from the toe of a rear foot to the heel of a front foot in a double stance phase. In other words, the target ZMP trajectory $x_{zmp}$ (t) denoted by relational expression (02) does not have to coincide with the actual target ZMP trajectory $x_{zmp}$.

The first arithmetic processing element 21 determines the amount of influence exerted by the target ZMP trajectory $x_{zmp}$ (t) on a divergent component q according to the dynamics model of the robot 1 (STEP03 of FIG. 3). To be specific, a difference $q_{diff}$ between a divergent component $q^{(cur2)}(t_{cur2})$ at cyclic gait start time (=current gait end time) $t_{cur2}$ and a target divergent component $q_{aim}$ is calculated. The suffix $^{(cur2)}$ means a support leg coordinate system of the current gait.

Figure 7:
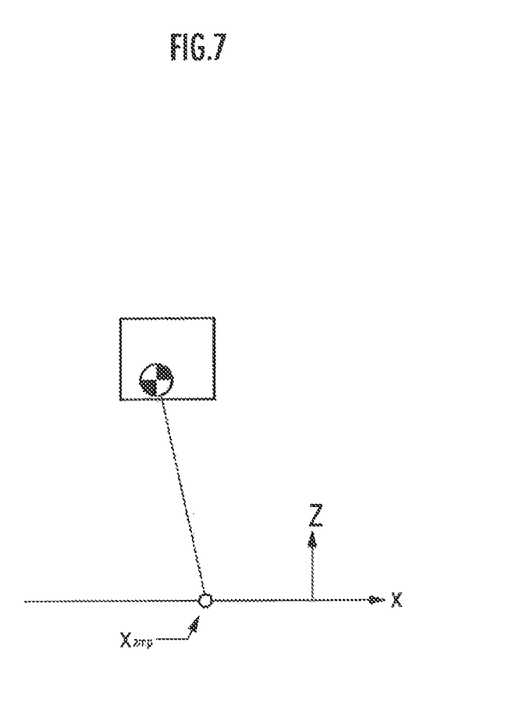
FIG. 7 is an explanatory diagram illustrating a dynamics model of the robot.
Figure 8:
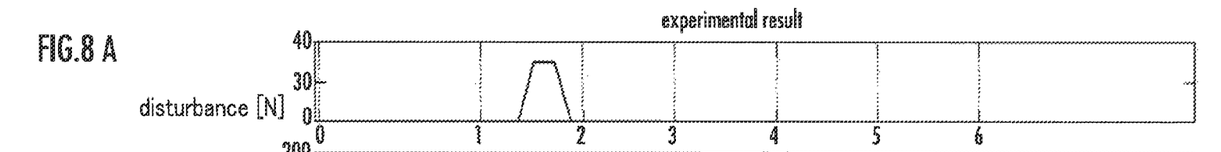

The dynamics model indicates the relationship between the motions of the body 10 and the legs 14 and the ground reaction forces acting on the robot 1. For example, an inverted pendulum model as illustrated in FIG. 7 is employed as the dynamics model (refer to Japanese Patent No. 3726081). The dynamics in a linear inverted pendulum model are represented by relational expression (04) by using a horizontal position of the inverted pendulum $x_{pend}$, a horizontal position of the supporting point of the inverted pendulum $x_{zmp}$, gravitational acceleration g, and a height of the inverted pendulum h (constant value). The dynamics model of the robot 1 may use a model of three mass points defined by a support leg foot mass point and a free leg foot mass point in addition to the inverted pendulum mass point.

$$d_2 x_{pend}/dt^2 = (g/h)(x_{pend} - x_{zmp}) \quad (04)$$

According to the linear inverted pendulum model, the divergent component q (and a convergent component p) of the robot 1 are represented by relational expression (06) by using a natural frequency $\omega = (g/h)^{1/2}$ of the inverted pendulum.

$$\begin{bmatrix} p \\ q \end{bmatrix} = \begin{bmatrix} 1 & -1/\omega \\ 1 & 1/\omega \end{bmatrix} \begin{bmatrix} x_{pend} \\ dx_{pend}/dt \end{bmatrix} \quad (06)$$

The divergent component $q_u$ ($t_0$, $t_e$) at time $t_e$ based on reference time $t_0$ is calculated according to relational expression (08).

$$q(t_0, t_e) = \exp(\omega t) q(t_0, t_0) - \omega \exp(\omega t) \int_{t_0}^{t_e} \exp(-\omega \tau) x_{zmp}(\tau) d\tau \equiv \quad (08)$$
$$\exp(\omega t) \{ q(t_0, t_e) + q_u(t_0, t_e) \}$$

Here, a function $q_u$ ($t_0$, $t_e$) constituting the second term of the right side of relational expression (08) is represented by using Laplace transformation according to relational expression (10).

$$q_u(t_0, t_e) = -\omega \int_{t_0}^{t_e} \exp(-\omega \tau) x_{zmp}(\tau) d\tau \quad (10)$$
$$= -\omega \left\{ \int_0^\infty \exp(-\omega \tau) x_{zmp}(\tau) d\tau - \int_0^\infty \exp(-\omega(\tau+t)) x_{zmp}(\tau+t) d\tau \right\}$$
$$= -\omega \{ L[x_{zmp}(\tau)] - \exp(-\omega t) L[x_{zmp}(\tau+t)] \}$$

If the definition of $x_{zmp}$ (t)=$t^n$ is applied, then $n!s^{-(n+1)}$ is obtained as the Laplace transformation result of $t^n$, and the function $q_u$ ($t_0$, $t_e$) is represented by relational expression (11) from binomial theorem.

$$q_u(t_0, t_e) = -\omega \left\{ n! \omega^{-n} - \exp(-\omega t) \sum_{m=0}^{n} {}_n P_{(n-m)} \tau^m \omega^{-(n-m)} \right\} \quad (11)$$

(Determining the Target Divergent Component $q_{aim}$)

An initial divergent component q ($t_{cur2}$, $t_{cur2}$) of a cyclic gait is determined as a target divergent component $q_{aim}$ such that the initial divergent component q ($t_{cur2}$, $t_{cur2}$) and a terminal divergent component q ($t_{cur2}$, $t_{cyc2}$) of the cyclic gait coincide with each other. The initial divergent component q ($t_{cur2}$, $t_{cor2}$) of the cyclic gait is represented by relational expression (14) by using coordinate transformation $\Xi_{cur2 \to cyc2}$ ( . . . ) from the support leg coordinate system of a current gait to the support leg coordinate system of a second cyclic gait.

$$q^{(cur2)}(t_{cur2}, t_{cur2}) = \Xi_{cur2 \to cyc2}(q^{(cur2)}(t_{cur2}, t_{cyc2})) \quad (14)$$

The coordinate transformation $\Xi_{cur2 \to cyc2}$ ( . . . ) is defined by relational expression (16) by using a rotation matrix Rz denoting the direction (yaw angle) of the support leg coordinate system of the second cyclic gait based on the support leg coordinate of the current gait, and a position $P_{cyc2}^{(cur2)}$ of the support leg coordinate system of the second cyclic gait based on the support leg coordinate of the current gait. The suffix $^{(cyc2)}$ means the support leg coordinate system of the second cyclic gait.

$$\Xi_{cyc2 \to cyc2}(x^{(cyc2)}) = Rz(x^{(cyc2)} + P_{cyc2}^{(cur2)}) \quad (16)$$

Based on relational expressions (08), (14) and (16), the target divergent component $q_{aim}$ is represented by relational expression (18).

$$q_{aim} \equiv q^{(cur2)}(t_{cur2}, t_{cur2}) = (I - \exp(\omega(t_{cyc2} - t_{cur2})Rz)^{-1} \quad (18)$$
$$\exp(\omega(t_{cyc2} - t_{cur2})Rz(q^{(cur2)}(t_{cur2}, t_{cur2}) - P_{cyc2}^{(cur2)})$$

In the case where the rotation matrix $R_z$ is approximated to a unit matrix I, the target divergent component $q_{aim}$ is represented by relational expression (20).

$$q_{aim} \equiv q^{(cur2)}(t_{cur2}, t_{cur2}) = \exp(\omega(t_{cyc2} - t_{cur2})) \quad (20)$$
$$(1 - \exp(\omega(t_{cyc2} - t_{cur2})Rz)^{-1} Rz(q^{(cur2)}(t_{cur2}, t_{cur2}) - P_{cyc2}^{(cur2)})$$

(Determining a Divergent Component Difference $q_{diff}$)

A difference $q_{diff}$ between the divergent component $q^{(cur2)}$ ($t_0$, $t_{cur2}$) at the current gait end time $t_{cur2}$ and the target divergent component $q_{aim}$ is calculated according to relational expression (22).

$$q_{diff} = q_{aim} - q^{(cur2)}(t_0, t_{cur2}) \quad (22)$$

The second arithmetic processing element 22 determines a ZMP modification amount $x_{zmp\_add}$ on the basis of the amount of influence on the divergent component, which has been determined by the first arithmetic processing element 21, such that a specified requirement is satisfied (STEP04 of FIG. 3).

In order to modify the target ZMP trajectory, a trapezoidal trajectory $x_{zmp\_unit}$(t) of a unit height is prepared, as indicated by the dot-and-dash line in FIG. 6. The times corresponding to the bend points of the trapezoid are selected among the phase boundary times set as the target ZMP trajectory parameters of the current gait (t=0, T1, $t_{cur1}$, $t_{cur1}$+$T_2$ and $T_{cur2}$ in the example illustrated in FIG. 6). A triangular trajectory $x_{zmp\_unit}$(t) extending over three phase boundary times may alternatively be adopted. A height ratio $q_{diff}/q_{unit}$ of a modification trapezoid is determined.

As described above, the time function α(t) is a function that can be subjected to the Laplace transformation, so that $q_α$ permits analytical calculation. Thus, the ZMP modification amount $x_{zmp\_add}$ determined according to relational expression (26).

$$x_{zmp\_add} = \frac{q_{diff}}{q_{unit}} x_{zmp\_unit}(t) \quad (26)$$

The ZMP trajectory $x_{zmp}$ (t) is approximated according to relational expression (28) by using a coefficient function $α_i$(t) for each section [$t_{i-1}$, $t_i$] (i=1, 2, ... N) (refer to relational expression (2)).

$$x_{zmp}(t) = α_i(t)x_{swg}(t) \quad (28)$$

Based on approximate expression (28), relational expression (10) is approximated as indicated by relational expression (30).

$$q_u(t_0, t_N) = -\omega \int_{t0}^{tN} \exp(-\omega\tau)α_i(\tau)x_{swg}(\tau)d\tau \quad (30)$$
$$= -\omega\left\{\int_{t0}^{t1} \exp(-\omega\tau)α_0(\tau)x_{swg}(t_0)d\tau + \right.$$
$$\int_{t1}^{t2} \exp(-\omega\tau)α_1(\tau)x_{swg}(t_1)d\tau + \ldots +$$
$$\left.\int_{tN-1}^{tN} \exp(-\omega\tau)α_{N-1}(\tau)x_{swg}(t_{N-1})d\tau\right\}$$
$$= \sum_{i=0}^{N-1} \exp(-\omega t_i)q_u(t_0, t_i)$$
$$= \sum_{i=0}^{N-1} \exp(-\omega t_i)(-\omega x_{swg}(t_i))$$
$$\{L[α_i(\tau)] - \exp(-\omega t_{i+1})L[α_i(\tau + t_i)]\})$$

Relational expression (30) is represented by relational expression (32) by using a coefficient matrix A.

$$q_u(t_0, t_N) = Ax_{swg}, x_{swg} \equiv (x_{swg}(t_0), \ldots, x_{swg}(t_{N-1}))^t \quad (32)$$

The target divergent component $q_{aim}$ and the divergent component $q^{(cur2)}$ ($t_0$, $t_{cur2}$) at the current gait end time $t_{cur2}$ and the difference $q_{diff}$ between these two are linear with respect to $q_u$( ). Hence, the ZMP modification amount $x_{zmp\_add}$ is defined as the linear function of the target landing position $x_{swg}$, as indicated by relational expression (34).

$$x_{zmp\_add} = A_{add}x_{swg} + b_{add} \quad (34)$$

In the case where the ZMP trajectory $x_{zmp}$ (t) is formed of a line graph, as illustrated in FIG. 6, relational expression (20) is represented by relational expression (36) by using relational expression (32).

$$q_{aim} \equiv \varepsilon A_{aim}x_{swg},$$
$$\varepsilon = \frac{e^{\omega(tcyc2-tcur2)}}{1 - e^{\omega(tcyc2-tcur2)}},$$
$$A_{aim} = [A^\sim, A^{\sim\prime}],$$

$$A^\sim = \begin{bmatrix} -\eta_{T4}^0 + & -\eta_{T4}^1 - e^{-\omega T4}\eta_{T5}^0 - & e^{-\omega T4:5}\eta_{T6}^1 - \\ \eta_{T4}^1 - \gamma_{11}, & \{\eta_{T6}^0 - \eta_{T6}^1\} + \gamma_{11}, & e^{-\omega T4:6}\eta_{T7}^0 \\ & e^{-\omega T4:5} & \\ \gamma_{21} & \gamma_{21} & 0 \end{bmatrix},$$

$$A^{\sim\prime} = \begin{bmatrix} \gamma_{12} & \gamma_{12} & 0 \\ & -\eta_{T4}^1 - e^{-\omega T4}\eta_{T5}^0 - & e^{-\omega T4:5}\eta_{T6}^1 - \\ -\eta_{T4}^0 + \eta_{T4}^1 - \gamma_{22}, & e^{-\omega T4:5} & e^{-\omega T4:6}\eta_{T7}^0 + 1 \\ & \{\eta_{T6}^0 - \eta_{T6}^1\} + \gamma_{21} & \end{bmatrix},$$

$$\eta_T^n = \frac{-1}{T^n}\left\{n!\omega^{-n} - e^{-\omega T}\sum_{m=0}^{n} {}_nP_{n-m}T^m\omega^{-(n-m)}\right\},$$

$$\begin{bmatrix} \gamma_{11} & \gamma_{12} \\ \gamma_{21} & \gamma_{22} \end{bmatrix} = Rz(\theta_{cur2}, \theta_{cyc1}) = \begin{bmatrix} \cos(\theta_{cur2} + \theta_{cyc1}) & -\sin(\theta_{cur2} + \theta_{cyc1}) \\ \sin(\theta_{cur2} + \theta_{cyc1}) & \cos(\theta_{cur2} + \theta_{cyc1}) \end{bmatrix},$$

$\theta_{cyc2}$, $\theta_{cyc1}$ Direction of support leg coordinate system observed from current gait support leg coordinate system $$x_{swg} = (x_{swg}(t_{cur1}), x_{swg}(t_{cur2}), x_{swg}(t_{cyc1}), y_{swg}(t_{cur1}), y_{swg}(t_{cur2}), y_{swg}(t_{cyc1})) \quad (36)$$

The divergent component $q^{(cur2)}(t_0, t_{cur2})$ at the current gait end time $t_{cur2}$ is represented by relational expression (38).

$$q^{(cur2)}(t_0, t_{cur2}) = \begin{bmatrix} 1 \\ e^{-\omega T0:1}\eta(1, T_2) + e^{-\omega T0:2}\eta(0, T_3) \end{bmatrix} \quad (38)$$

$$\begin{bmatrix} q(t_0, t_0) + \{\eta(0, T_0) - \eta(, T_0)\}x_{swg}(t_0) \\ x_{swg}(t_0) \end{bmatrix}$$

Therefore, the ZMP modification amount $x_{zmp\_acid}$ generally represented by relational expression (26) is calculated according to relational expression (40) in a linear approximation model.

$$x_{zmp\_add} = A_{add}x_{swg} + b_{add}, \quad (40)$$

$$b_{add} = \frac{1}{q_{unit}} \begin{bmatrix} -[q(t_0, t_0) + \{\eta(0, T_0) - \eta(1, T_0)\}x_{swg}(t_0)] \\ -[q(t_0, t_0) + \{\eta(0, T_0) - \eta(0, T_1)\}y_{swg}(t_0)] \end{bmatrix},$$

$$A_{add} = \frac{1}{q_{unit}}(\tilde{A}_{add}(1{:}3), \tilde{A}_{add}(4{:}6))$$

$$\tilde{A}_{add}(1{:}3) = \begin{pmatrix} \varepsilon(-\eta_{T4}^0 + \eta_{T4}^1 - \gamma_{11}) - \\ e^{\omega t cur2}(e^{-\omega T0:1}\eta_{T2}^1 + e^{-\omega T0:2}\eta_{T3}^0) & , \varepsilon\gamma_{21} \\ -\varepsilon\eta_{T4}^0 - e^{\omega T4}\eta_{T5}^0 - e^{-\omega T4:5} \\ (\eta_{T6}^0 - \eta_{T0}^1) - \gamma_{11} & , \gamma_{21} \\ \varepsilon(-e^{\omega T4:5}\eta_{T6}^1 - e^{-\omega T4:6}\eta_{T7}^0 + 1) & 0 \end{pmatrix}^t$$

$$\tilde{A}_{add}(4{:}6) = \begin{pmatrix} \varepsilon(-\eta_{T4}^0 + \eta_{T4}^1 - \gamma_{22}) - \\ -\varepsilon\gamma_{12}, & (e^{-\omega T0:1}\eta_{T2}^1 + e^{-\omega T0:2}\eta_{T3}^0), \\ -\varepsilon\eta_{T4}^0 - e^{\omega T4}\eta_{T5}^0 - e^{\omega T4:5} \\ \varepsilon\gamma_{12}, & (\eta_{T6}^0 - \eta_{T0}^1) + e^{-\omega T4:7}\gamma_{22}, \\ 0, & \varepsilon(-e^{\omega T4:5}\eta_{T6}^1 - e^{-\omega T4:7}\gamma_{22}) \end{pmatrix}^t$$

The ZMP modification amount $x_{zmp\_add}$ denoted by relational expression (26) is added to the target ZMP trajectory of the current gait such that the difference $q_{diff}$ in divergent component becomes zero, thereby modifying the target ZMP trajectory parameters of the current gait. For example, the target ZMP trajectory at $t=t_{cur1\sim cur2}$ is modified by adding the triangular trajectory $x_{zmp\_add}$, which is indicated by the chain double-dashed line, to the target ZMP trajectory indicated by the solid line in FIG. 6 (refer to the chain double-dashed line).

A first specified requirement as a specified requirement is a condition that the target ZMP trajectory $x_{zmp}$ falls within a permissible existence range (e.g. a supporting polygon), the placement configuration of which is determined according to the placement configuration of the contact surface between the plurality of legs and a floor. The first specified requirement is defined by relational expression (42) by using a lower limit value $x_{zmp\_add\_min}$ and an upper limit value $x_{zmp\_add\_max}$ of the ZMP modification amount $x_{zmp\_add}$ determined according to the placement configuration (the shape, the size, the position and the posture) of the permissible existence range.

$$x_{zmp\_add\_min} \leq A_{zmp\_add}x_{avg} + b_{zmp\_add} \leq x_{zmp\_add\_max} \quad (42)$$

A second specified requirement as another specified requirement is a condition that an assessment function $f(x_{swg})$ based on a specified standard of the target landing position $x_{swg}$ indicates a maximum value or a minimum value. In the present embodiment, the specified standard is the agreement with a reference landing position $x_{swg\_ref}$, and the assessment function $f(x_{swg})$ is defined as a quadratic function of the interval between the target landing position $x_{swg}$ and the reference landing position $x_{swg\_ref}$ according to relational expression (44).

$$\min(x_{swg} - x_{swg\_ref})^T H(x_{swg} - x_{swg\_ref}) \quad (44)$$

H denotes a weighting matrix for adjusting the degree of following $x_{swg\_ref}$. In this case, the solution to the optimization of the landing position $x_{swg}$ of the robot is searched for such that a further specified requirement represented by relational expression (42) is satisfied in addition to the first specified requirement (refer to relational expression (38) and the second specified requirement (refer to relational expression (40)).

The assessment function $f(x_{swg})$ may be defined as an increasing function or a decreasing function of the interval (norm), such as a linear function or an exponent function, rather than the quadratic function.

The target landing position $x_{swg}$ that satisfies the first specified requirement and the second specified requirement is searched for as a solution to a quadratic program problem with linear constraint. The term "linear constraint" in this case is a constraint that the first specified requirement related to the ZMP modification amount $x_{zmp\_add}$, (Or the target ZMP trajectory $x_{zmp}(t)$), which is linearly approximated, is satisfied. The assessment function $f(x_{swg})$ is a quadratic function, thus permitting faster calculation for searching for an optimal solution of the target landing position $x_{swg}$.

Based on the amount of influence on the divergent component determined by the first arithmetic processing element 21, the second arithmetic processing element 22 determines the target landing position $x_{swg}$ according to the ZMP modification amount $x_{zmp\_add}$ such that the specified requirements are satisfied (STEP05 of FIG. 3).

Based on the foot trajectory parameters of the current gait including the target landing position $x_{swg}$ determined as described above and the target ZMP trajectory parameters, the position and the velocity of the inverted pendulum mass point are calculated according to relational expression (04), and the position of the body corresponding thereto is calculated. Further, based on the position of the body 10 and the position and the posture of the foot 15, the joint angle of the leg 14 is calculated according to an inverted dynamics model.

(Experimental Results)

As illustrated in FIG. 8(1), a gait in the case where, during a phase in which the robot 1 is about to take a second step, a trapezoidal external force is applied to the robot 1 in a lateral direction (a Y-direction) from a side opposite from the foot that is about to take the step was calculated. FIG. 8(2) to FIG. 8(7) illustrate the calculation results of the gait.

FIG. 8(2) to FIG. 8(4) illustrate the x-coordinate components $x_{cur1}$, $x_{cur2}$, and $x_{cyc1}$ of the landing positions in a first current gait, a second current gait, and a first cyclic gait, respectively. FIG. 8(5) to FIG. 8(7) illustrate y-coordinate components $y_{cur1}$, $y_{cur2}$, and $y_{cyc1}$ of the landing positions in the first current gait, the second current gait, and the first cyclic gait, respectively. The target landing positions $x_{swg}$ are denoted by the solid lines, while the reference landing positions $x_{swg\_f}$ are denoted by the dashed lines.

As illustrated in FIG. 8(5) to FIG. 8(7), the y-coordinate components of the target landing positions of the second step are set to be shifted by approximately 200 mm from the y-coordinate components of the reference landing positions $x_{swg\_ref}$, and the gaits are generated such that the y-coordinate components of the landing positions $x_{swg}$ of a third step and after coincide with the y-coordinate components $y_{swg\_ref}$ of the reference landing positions $x_{swg\_ref}$. In other words, in response to the external force applied in the Y-direction to the robot 1 in the middle of the robot 1 taking the second step, the robot 1 moves the foot in the same direction so as to stabilize the posture thereof.

(Another Embodiment of the Present Invention)

In the case where a landable range is restricted, the gait of the robot 1 may be controlled in the same manner. A case will be discussed, where a plurality of obstacles is present in the direction in which the robot 1 is expected to proceed, and a landable range will be approximately represented by relational expression (46) to avoid interference with the plurality of obstacles.

$$a_1 x_{swg} + a_2 y_{swg} + b_1 < 0, a_3 x_{swg} + a_4 y_{swg} + b_2 > 0 \tag{46}$$

What is claimed is:

1. A robot comprising: a body; a plurality of legs extended from the body; and a control unit configured to control motions of the plurality of legs so as to follow a target gait that includes a target zero moment point (ZMP) trajectory and target landing positions of the plurality of legs, wherein the target ZMP trajectory is defined by a linear function of target landing positions of the plurality of legs, and a coefficient of the linear function is defined as a time function permitting Laplace transformation, and wherein the control unit comprises:

a first arithmetic processing element configured to determine an amount of an influence exerted by a current target ZMP trajectory on a divergent component of a behavior of the body defined in a relational equation, based on the current target ZMP trajectory, according to a dynamics model representing a relationship between motions of the body and the plurality of legs and a ground reaction force acting on the robot and defined by at least the relational equation and the Laplace transformation; and a second arithmetic processing element configured to
 determine, based on the amount of the influence determined by the first arithmetic processing element, a ZMP modification amount defined as a linear function of the target landing positions,
 determine a new target ZMP trajectory by adding the ZMP modification amount to the current ZMP trajectory,
 determine a placement configuration of a permissible existence area according to a placement configuration of a contact surface between the plurality of legs and a floor, and
 determine the target landing positions based on the ZMP modification amount such that a first specified requirement is satisfied that the new target ZMP trajectory falls within the permissible existence area.

2. The robot according to claim 1,
wherein the second arithmetic processing element is configured to determine the target landing positions such that a second specified requirement that an assessment function based on a specified assessment standard of the target landing positions indicates a maximum value or a minimum value is also satisfied.

3. The robot according to claim 2,
wherein the second arithmetic processing element is configured to determine the target landing positions by using, as the assessment function, an increasing function or a decreasing function, which uses an interval between the target landing positions and desired landing positions or a boundary of a permissible landing range as a variable.

4. The robot according to claim 3,
wherein the second arithmetic processing element is configured to determine the target landing positions by using a quadratic function as the assessment function.

5. A robot comprising: a body; a plurality of legs extended from the body; and a control unit configured to control motions of the plurality of legs so as to follow a target gait that includes a target zero moment point (ZMP) trajectory and target landing positions of the plurality of legs, wherein the target ZMP trajectory is defined by a linear function of target landing positions of the plurality of legs, and a coefficient of the linear function is defined as a time function permitting Laplace transformation, and wherein the control unit comprises:

a first arithmetic processing element configured to determine an amount of an influence exerted by a current target ZMP trajectory on a divergent component of a behavior of the body defined in a relational equation, based on the current target ZMP trajectory, according to a dynamics model representing a relationship between motions of the body and the plurality of legs and a ground reaction force acting on the robot and defined by at least the relational equation and the Laplace transformation; and a second arithmetic processing element configured to
 determine a provisional target landing positions of the plurality of legs,
 determine, based on the amount of the influence determined by the first arithmetic processing element, a provisional ZMP modification amount defined as a linear function of the provisional target landing positions, determine a provisional target ZMP trajectory by adding the provisional ZMP modification amount to the current target ZMP trajectory,
 determine a placement configuration of a permissible existence area according to a provisional placement configuration of a contact surface between the plurality of legs at the provisional target landing positions and a floor, and
 determine the provisional target landing positions as the target landing positions when the provisional target ZMP trajectory falls within the permissible existence area.

* * * * *